United States Patent
Shin et al.

(10) Patent No.: US 9,471,887 B2
(45) Date of Patent: Oct. 18, 2016

(54) AUTOMATIC TASK CLASSIFICATION BASED UPON MACHINE LEARNING

(71) Applicant: NTT DOCOMO Inc., Tokyo (JP)

(72) Inventors: Hyung Sik Shin, Palo Alto, CA (US); Ronald Sujithan, Palo Alto, CA (US); Sayandev Mukherjee, Palo Alto, CA (US); Hongfeng Yin, Palo Alto, CA (US); Yang Sun, Palo Alto, CA (US); Yoshikazu Akinaga, Palo Alto, CA (US); Pero Subasic, Palo Alto, CA (US)

(73) Assignee: NTT DOCOMO Inc., Tokyo (JP)

(*) Notice: Subject to any disclaimer, the term of this patent is extended or adjusted under 35 U.S.C. 154(b) by 0 days.

(21) Appl. No.: 14/871,595

(22) Filed: Sep. 30, 2015

(65) Prior Publication Data

US 2016/0019471 A1    Jan. 21, 2016

Related U.S. Application Data

(63) Continuation of application No. PCT/US2014/067475, filed on Nov. 25, 2014.

(60) Provisional application No. 61/909,992, filed on Nov. 27, 2013.

(51) Int. Cl.
*G06N 99/00* (2010.01)
*G06F 15/18* (2006.01)
*G10L 15/00* (2013.01)
*G10L 15/18* (2013.01)
*G06F 17/30* (2006.01)
*G06F 9/48* (2006.01)
*G10L 15/06* (2013.01)

(52) U.S. Cl.
CPC .......... *G06N 99/005* (2013.01); *G06F 9/4881* (2013.01); *G06F 15/18* (2013.01); *G06F 17/30654* (2013.01); *G10L 15/00* (2013.01); *G10L 15/1822* (2013.01); *G10L 2015/0633* (2013.01)

(58) Field of Classification Search
None
See application file for complete search history.

(56) References Cited

U.S. PATENT DOCUMENTS

| | | | |
|---|---|---|---|
| 7,558,766 B1 * | 7/2009 | Forman | G06K 9/6256 706/20 |
| 2004/0148154 A1 * | 7/2004 | Acero | G06F 17/2715 704/1 |
| 2005/0080782 A1 * | 4/2005 | Ratnaparkhi | G06F 17/30654 706/12 |
| 2006/0074630 A1 * | 4/2006 | Chelba | G06N 7/005 704/9 |
| 2007/0217676 A1 * | 9/2007 | Grauman | G06K 9/4671 382/170 |
| 2008/0162117 A1 * | 7/2008 | Bangalore | G06F 17/2818 704/10 |
| 2011/0107242 A1 * | 5/2011 | Paek | G06Q 10/10 715/762 |
| 2013/0246322 A1 * | 9/2013 | De Sousa Webber | G06N 3/0454 706/18 |
| 2014/0121985 A1 * | 5/2014 | Sayood | G06F 19/24 702/19 |
| 2015/0100523 A1 * | 4/2015 | Hellstrom | G06N 99/005 706/11 |

* cited by examiner

*Primary Examiner* — Stanley K Hill
*Assistant Examiner* — Benjamin Buss
(74) *Attorney, Agent, or Firm* — Haynes and Boone, LLP (57) ABSTRACT

A system and method is provided that processes a training database of human-generated requests in each of a plurality of task categories with a machine learning algorithm to develop a task classifier model that may be applied to subsequent user requests to determine the most likely one of the task categories for the subsequent user request.

10 Claims, 7 Drawing Sheets

AUTOMATIC TASK CLASSIFICATION BASED UPON MACHINE LEARNING

RELATED APPLICATIONS

This application is a continuation of PCT Patent Application No. PCT/US2014/67475, filed Nov. 25, 2014, which claims the benefit of U.S. Provisional Application No. 61/909,992, filed Nov. 27, 2013, the contents of both which are incorporated herein by their entireties.

TECHNICAL FIELD

The present disclosure relates generally to personal assistant applications, and more particularly to the processing of user requests based upon machine learning.

BACKGROUND

Various personal assistant software applications have been developed that respond to a user's text or natural language request by carrying out corresponding tasks. For example, a personal assistant application accessed by a smartphone user may make look up phone numbers and place calls, search for restaurants, draft and send emails, make calendar entries, and so on. In that regard, a particular user will often phrase a request for a given task differently from other users' phrasings. Such variation is inherent with regard to human interaction. Due to this variability, conventional personal assistant software applications are typically error-prone with regard to properly executing the desired request of a user. Moreover, the resulting applications tend to be ad hoc and thus difficult to apply to different languages.

Accordingly, there is a need in the art for language-independent improved systems having better accuracy with regard to classifying and executing tasks wanted by users.

SUMMARY

To provide improved accuracy with regard to task classification and execution, systems and methods are provided that exploit machine learning algorithms for task classification. A training database is generated from various users with regard to how they phrased requests within a plurality of task categories. By canvassing a sufficiently large number of users, the natural variation of how individual users phrase a given desired task may be properly sampled. For example, with regard to a task of calling a particular party such as their mother, one user may phrase it as "call mom" whereas another user may phrase it as "please call mom" or "call mother." A relatively large training database may be generated through, for example, crowd sourcing to characterize these variations on how given tasks are phrased by different users. The resulting training database may contain the response of thousands of users with regard to requesting particular tasks from a plurality of task categories. Since it is known a priori that the user was intending a particular task, the resulting user request has no ambiguity with regard to its classification. The training database may thus have numerous examples of various users' requests, all organized into their appropriate task categories.

Such a high-quality training database may then be exploited through various machine learning algorithms. For example, each database user request may be converted into a feature vector or other mathematical representation. The training database would thus include various feature vectors for each task category, each feature vector corresponding to a given training database user's request. The dimensionality of each feature vector depends upon the desired complexity. For example, each unique word (or phrase) within a given user's request may correspond to a feature vector dimension. The weight for each feature vector dimension may depend upon how many times the corresponding word or phrase occurs in the corresponding user's request. Alternatively, the weights may be binary such that the weighting merely depends upon whether a given word or phrase was present or not in the user request. The resulting feature vectors may then be used to train a machine learning algorithm such as a support vector machine to determine a task classifier model of how the various user requests for each task are clustered in the feature vector space.

Given this a priori machine learning on a high-quality training database of human-generated requests for various tasks to develop a task classifier model, additional user requests may then be robustly classified in real time according to task classifier model. In other words, a received user request may be readily converted into text (in the case of a natural language input) and the corresponding text converted into a feature vector and classified into a predicted one of the task categories according to the pre-determined task classifier model. This process not only increases the accuracy of task classification but is also language independent: one need merely collect a training database in other languages to extend the process to accommodate user requests in the corresponding languages.

To increase the accuracy of task execution, the user's request may be further processed based upon the identity of the predicted task to determine its specific queries (if any). In that regard, each task category may be associated with various query categories. For example, suppose a user request has been classified into a "restaurant search" task category. This task classification may be associated with various query classes such as "type of restaurant" (e.g., Italian or Chinese) and "location of restaurant" (e.g., Palo Alto). The instantiations for the query classes in a given user request are denoted herein as "queries." For instance, a user request of "find a good Italian restaurant in Palo Alto" may be processed to extract the cuisine query (Italian) and location query (Palo Alto). To increase the accuracy of the query extraction, a dictionary of query classes and corresponding possible queries may be developed. For example, the dictionary may include an entry for each possible location in the location query category. The query extraction may then comprise identifying matching dictionary entries in the user's request, which are then readily associated with the corresponding query class in the dictionary.

A task execution module may use the predicted task and any associated queries by invoking the appropriate application programming interface (API). For example, a restaurant search task may be best performed using an external search provider such as "Yelp" that services restaurant searches. On the other hand, if the predicted task is call initiation, the associated query would be transmitted through the API for the cellular telephone function in the user's portable device.

Additional features and advantages of the systems and methods disclosed herein may be better appreciated through the following detailed description.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

To provide greater accuracy for the execution of user requests by a personal assistant application, a task classifier is trained through a machine learning algorithm on a training database of previously-recorded user requests for a set of tasks. For example, crowd sourcing may be used to generate the training database that includes human-generated requests for a number of tasks. In that regard, a particular user will often phrase a request for a given task differently from other users' phrasings. Such variation is inherent with regard to human interaction. Due to this variability, conventional personal assistant software applications are often error-prone with regard to properly executing the desired request of a user. Over time, such conventional personal assistant applications may learn from their mistakes by being corrected by the user so that the appropriate task is executed. But such learning over time can be quite frustrating for the user such that the user quits using the personal assistant application rather than spend the time necessary for the correction of inevitable mistakes with regard to carrying out the user's intentions.

In sharp contrast, the systems and methods disclosed herein use a task classifier trained on the training database to predict the corresponding tasks for user requests so that users need not overcome a training hurdle to achieve accurate results. In addition, the identified task may then be exploited to extract queries and corresponding query categories or classes from the user request. As used herein, the term "query" with regard to extraction of queries from a user request refers to the particular parameters of a given task. Based upon the task, these parameters may be organized into classes. For example, a restaurant search will typically identify the type of cuisine that the user desires and a desired location. The type of cuisine and desired location would each comprise a query class. The "query" would then comprise the particular instantiation of each query class. For example, a user request of "Find an Italian restaurant in Palo Alto" would have the query of "Italian" for the type of cuisine and "Palo Alto" for the desired location. Note that the accuracy of this query extraction is greatly enhanced by being performed responsive to the predicted task. With regard to the query extraction, each task category may be associated with a dictionary of possible queries and their corresponding query categories. Once a user request has been classified into a particular predicted task, the user request may be compared to the corresponding dictionary for that task to identify matches for any queries and the corresponding query classes.

A task execution module may then use the identification of the predicted task and the corresponding queries to execute the user's request. For example, the task execution module may use the predicted task to transmit the queries to a corresponding application programming interface (API). Regardless of whether APIs are selected, the resulting task execution is remarkably accurate as compared to conventional approaches. Some example embodiments will now be discussed.

Example Embodiments

Figure 1:
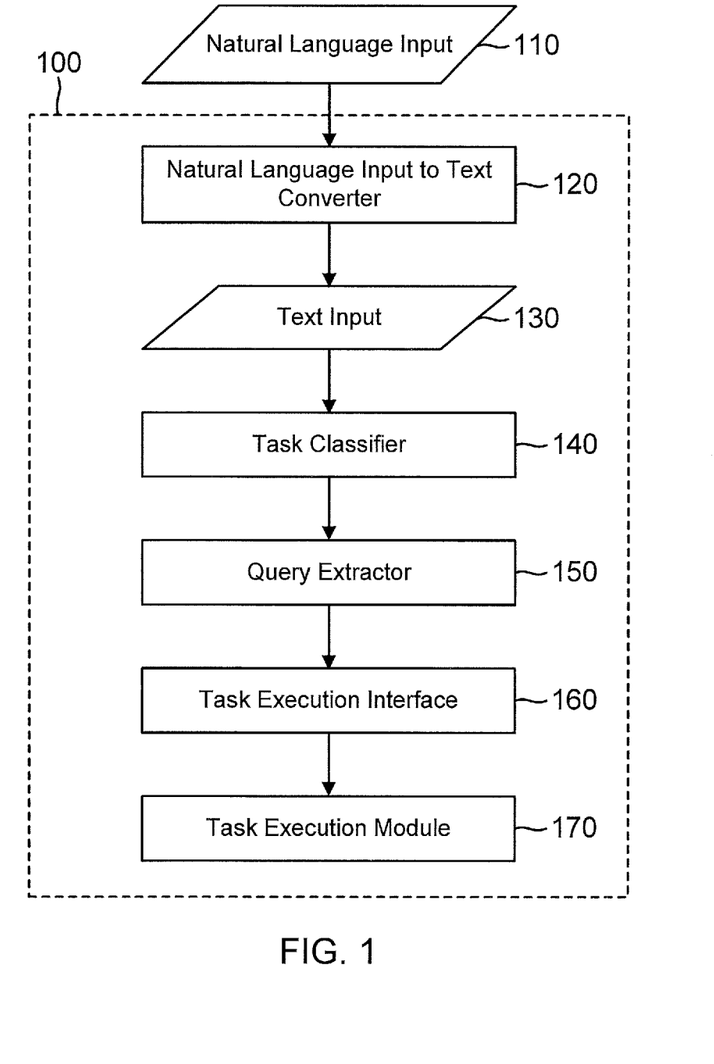
FIG. 1 is a block diagram of a system for executing user requests in accordance with an embodiment of the disclosure.

Turning now to the drawings, FIG. 1 shows an example system 100 for executing a user request such as received through a natural language input 110. System 100 functions to process a user request such as represented by a natural language input 110 to predict a corresponding task desired by the user. System 100 is readily configured to classify a user's request as corresponding to a given task as selected from a set of potential task categories. The size of the set of potential tasks that may be serviced by system 100 is merely a design choice as discussed further herein. This is particularly advantageous as system 100 is thus readily scalable. Moreover, as will be explained further herein, system 100 is also readily adapted to other languages besides English.

Figure 2:
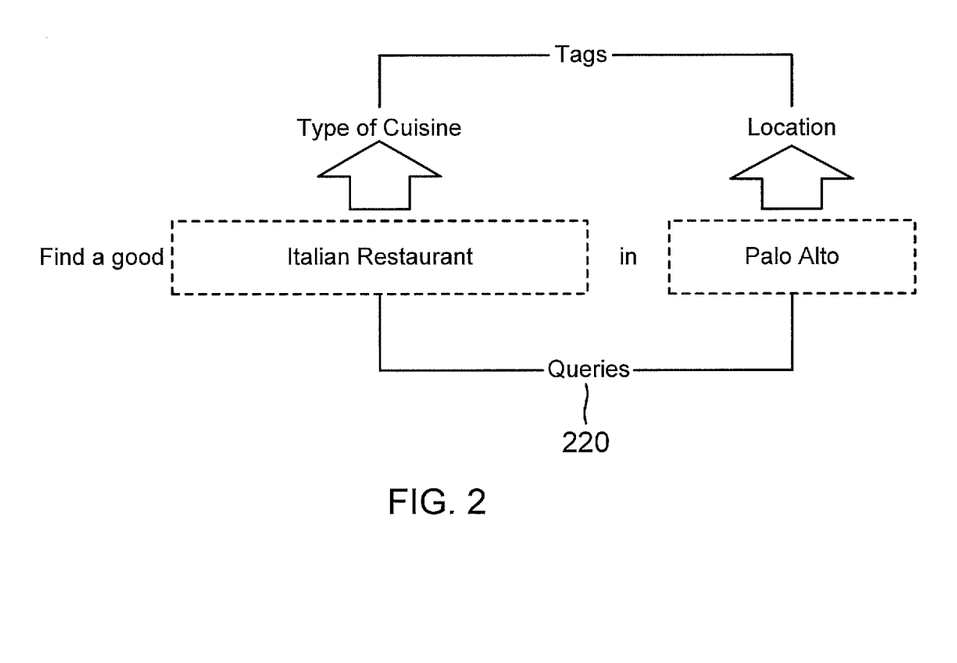
FIG. 2 illustrates the query extraction from a user request after its task classification.

A natural language input to text converter module 120 converts a user's natural language input 110 into a text input 130. Alternatively, a user may directly provide text input 130 as opposed to providing a (spoken) natural language input 110. A task classifier module 140 processes text input 130 to predict a desired task for the user as will be explained further herein. Based upon the predicated task as determined by task classifier module 140, a query extractor module 150 processes text input 130 to extract the queries and corresponding query classes. An example query extraction 220 is shown in FIG. 2. In this case, the user request of "Find a good Italian restaurant in Palo Alto" has been classified into a restaurant search task by task classifier module 140 of FIG. 1. The restaurant search task includes two query classes: type of restaurant and also location. Query extractor 150 of system 100 analyses the user request to identify the instantiation of each query class—in other words, query extractor 150 identifies the corresponding query for each query class. In the example of FIG. 2, the resulting queries 220 are Italian restaurant and Palo Alto. Referring again to FIG. 1, a task execution interface module 160 uses the predicted task to select for an appropriate task execution interface such as an API in a task execution module 170.

Figure 3:
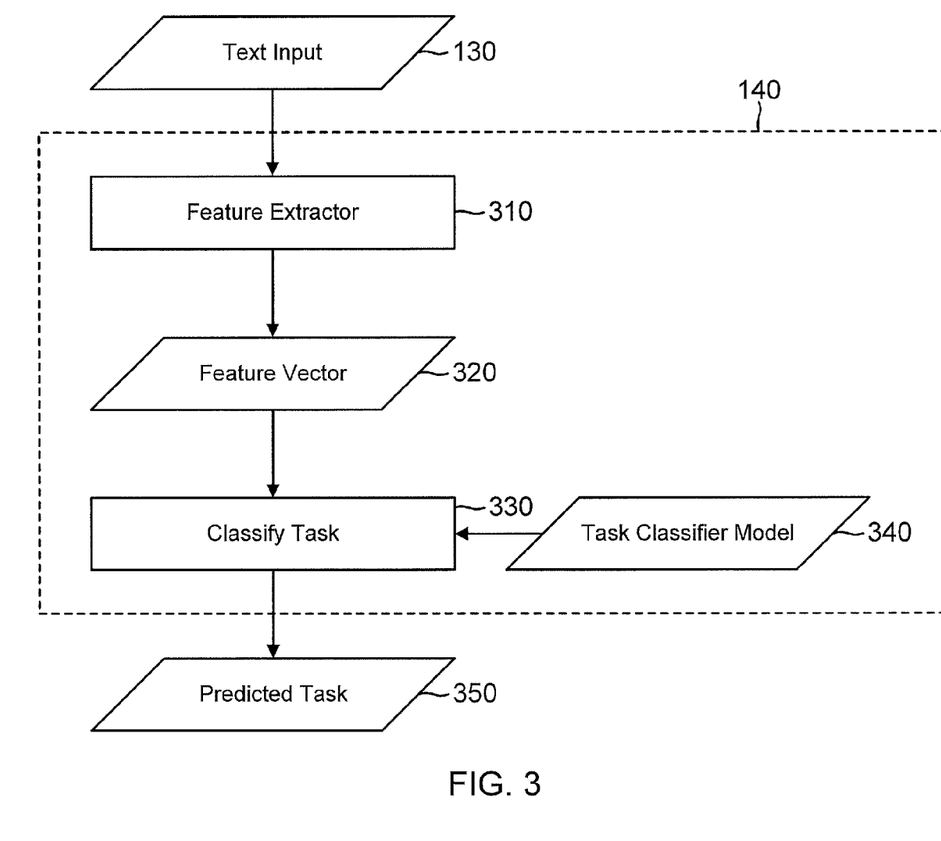
FIG. 3 is a more detailed block diagram for the task classification module in the system of FIG. 1.
Figure 4:
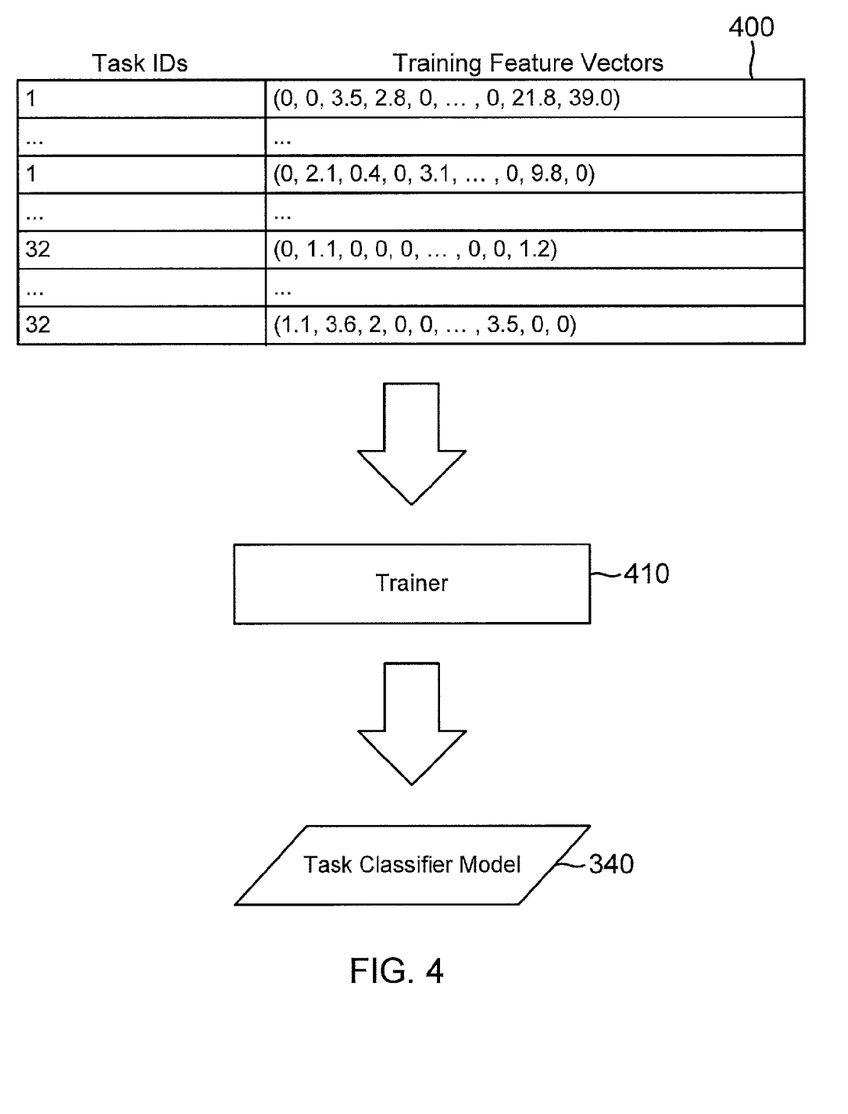
FIG. 4 illustrates modules for creating a task classifier model used by the task classification module of FIG. 3.

The operation of the various modules in system 100 will now be discussed in more detail. An expanded block diagram for task classifier module 140 is shown in FIG. 3. A feature extractor module 310 in module 140 processes text input 130 to extract a feature vector 320. This extraction is performed also on the training data set 400 of FIG. 4. Training data set 400 includes many previously-collected user requests over various task categories or classifications. In the embodiment of FIG. 4, there are 32 task classifications. The user request for each task is assigned the same task ID, which may comprise an integer. For example, training data set 400 may span over the tasks in the following Table 1:

TABLE 1

| Transportation | Map | Weather | Music | Movie | Photo | SNS | News |
|---|---|---|---|---|---|---|---|
| Game | Apps | Restaurant | Recipe | Book | Shopping | Travel | Wikipedia |
| Hospital | Information | Call | Email | Camera | Check schedule | Schedule | Memo |
| Timer | Alarm | Music player | Greeting | Praise | Dispraise | Boredom | Love |

It will be appreciated that the number of task categories may be readily varied for alternative embodiments. Training data set 400 may be generated by crowd sourcing, translation of existing training data in other natural languages, website crawling, or other suitable methods. In a crowd sourcing embodiment, anonymous human users answer a questionnaire regarding their phrasing for various tasks such as for the tasks of Table 1. The users answer the questions such as through natural language responses that may then be converted into input texts to build up a training database that may have its feature vectors extracted to form training data set 400. An example training database of input texts prior to feature extraction is shown in the following Table 2:

TABLE 2

| Restaurant Search | Where is a nice burger place nearby? |
|---|---|
| . . . | . . . |
| Call | Call Mom. |
| . . . | . . . |
| Call | Call Joe. |

In this example training database of text inputs and corresponding tasks, the possible task categories would include a "Restaurant Search" task category and a "Call" task category. The example text for a restaurant search is "Where is a nice burger place nearby." The training database can readily be extended to include many thousands of such example restaurant searches generated by human users. Other tasks may also be represented by thousands of example texts generated by human users. In Table 2, the "call" task includes two example texts of "Call Mom" and "Call Joe." In general, the more texts that can be entered into the training database, the better in that the machine learning algorithms disclosed herein learns from each such example. Since the tasks are already identified a priori, each datum in the training database comprises a task name (task ID) and the corresponding text input generated by the human user. All user requests in training data set 400 for a given category such as "Transportation" are given the same task ID. The text for the corresponding user request is converted into a training feature vector by feature extraction module 310 or its equivalent. In one embodiment, each different word in training data set 400 corresponds to a feature represented by a binary value. If a text input has a particular word, then the binary value corresponding to feature for this word is set to one. In addition, each different N-gram, a phrase consisting of N words in the user request may also be assigned a binary value. The resulting feature vector space for the training feature vectors will thus have a number M dimensions, where M equals the sum of all the different words and N-grams found in training data set 400. In one embodiment, only bi-grams (two consecutive words) in addition to the individual words are assigned to individual features to lower the resulting complexity. Note that other weighting schemes may be exploited to create the training feature vectors such as a term frequency-inverse document frequency (TF-IDF). For example, the training feature vectors in training data set 400 of FIG. 4 have non-integer coefficients for their various dimensions.

The training feature vectors in training data set 400 may be considered to form a dictionary of features (individual words and N-grams) that may be used in text input 130. Referring again to FIG. 3, feature extractor module 310 analyzes the user's text input 130 for any features (individual words and any applicable N-grams) that were used to construct the training feature vectors in training data set 400. Words and N-grams that do not match what occurred in training data set 400 may be ignored. In one embodiment, each matching feature in text input 130 is given a binary weight of one but such weighting may be modified as discussed above. A resulting feature vector 320 may then be processed by a task classifier sub-module 330 according to a task classifier model 340 extracted from training data set 400 to provide a predicted task 350 from the set of tasks used in the construction of training data set 400.

Referring again to FIG. 4, a machine learning algorithm as implemented by a trainer module 410 processes the training feature vectors in training data set 400 to generate task classifier model 340. There are assorted suitable machine learning algorithms that may be implemented by machine learning training module 410 such as a support vector machine (SVM) or naïve Bayes classifiers. Based upon the particular machine learning algorithm, task classifier model 340 produced by training module 410 enables task classifier sub-module 330 to determine the most likely predicted task 350 for feature vector 320. In that regard, the training feature vectors for a given task will tend to cluster in the vector space created by the various features. Based upon this clustering, task classifier sub-module 330 can then determine the most likely task category that feature vector 320 would belong to if feature vector 320 were part of the original training feature vectors used to construct training data set 400.

Note that this a priori machine learning on training feature vectors is entirely independent of the language spoken by the users in that the feature vectors are not words but instead are mathematical entities. It is thus straightforward to extend system 100 to other languages by merely generating a corresponding training data set to construct the appropriate task classifier model. Regardless of the particular language used for a given market of users, they may thus enjoy the advantageously accurate task classification disclosed herein. Not only is this task classification more accurate than the ad hoc techniques used in conventional personal assistant applications, the resulting task classification makes query extraction more accurate as well.

Figure 5:
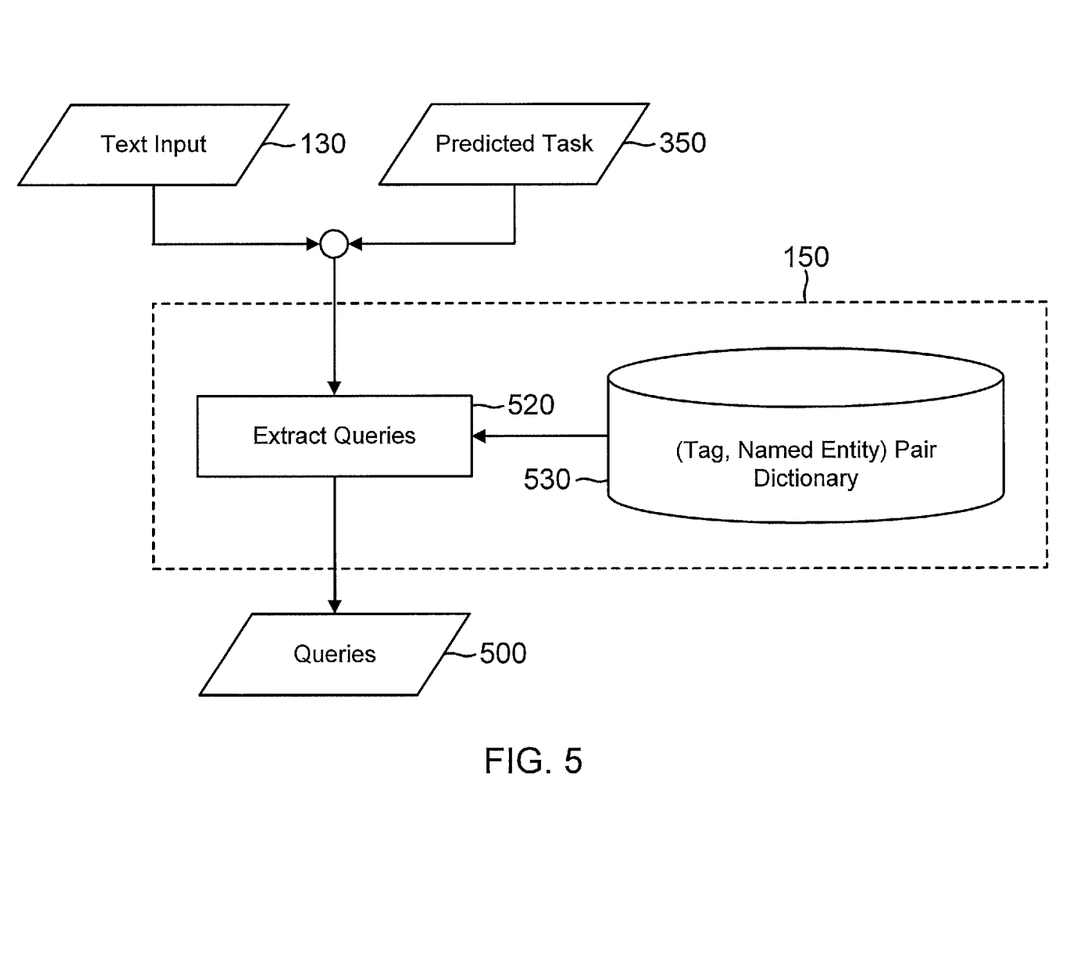
FIG. 5 is a more detailed block diagram for the query extraction module in the system of FIG. 1.

Query extractor module 150 is shown in more detail in FIG. 5. With regard to each task, note that some tasks will not have associated queries. For example, the boredom task relates to a user wanting to be told a joke by system 100. In one embodiment, there is no further classification of a boredom task other than its identification by task classifier module 140. But that is not the case for other tasks such as the call task-system 100 must do more than merely identify that a given user request corresponds to a call task because system 100 needs to know what party is to be called. These additional parameters are organized as discussed earlier into "query classes." For example, a restaurant search will typically identify the type of restaurant desired as one query class. In addition, the same restaurant search will also usually identify the location as another query class. Given the identity of the various query classes for each task (if applicable), a dictionary 530 may then be formed. Each dictionary entry would be a data pair of the query class (which may also be denoted as a "tag") and a particular instantiation of the query class (the associated query).

With regard to the formation of dictionary 530, note that one cannot expect to identify every possible query in training data set 400 as it would then have to include every possible user request that could be made by any given user, which is of course untenable. There are potentially billions of users that may interact with system 100 so training data set 400 cannot already contain every possible query from so many potential users. But databases such as Wikipedia may be readily analyzed to identify all potential queries for a given query class such as "location." For example, all towns in the United States or another desired country may be identified from such a database and entered into dictionary 530 in conjunction with the location tag for a restaurant search task. Similarly, the possible types of cuisine may also be entered into dictionary 530 in conjunction with the type of cuisine tag for the restaurant search task. Potential queries for the tags for other search tasks may also be instantiated through searches of suitable databases. For example, a "name of the called party" tag for a call task may be instantiated with first names (and also surnames if desired). This is quite advantageous in that possible queries are thus readily anticipated and entered into dictionary 530 so that once a user request is predicted to belong to a given task category, the corresponding queries are readily identified by a query extraction module 520. To do so, module 520 compares the words in text input 130 to the dictionary entries in dictionary 530 for the associated tags (query classes). For example, referring again to FIG. 2, the term "Palo Alto" may have a match in dictionary 530 under the location tag. Similarly, the term "Italian restaurant" may have a match in dictionary 530 under the type of cuisine tag. In this fashion, a given text input 130 is readily identified by system 100 to identify its pertinent queries 500.

Figure 6:
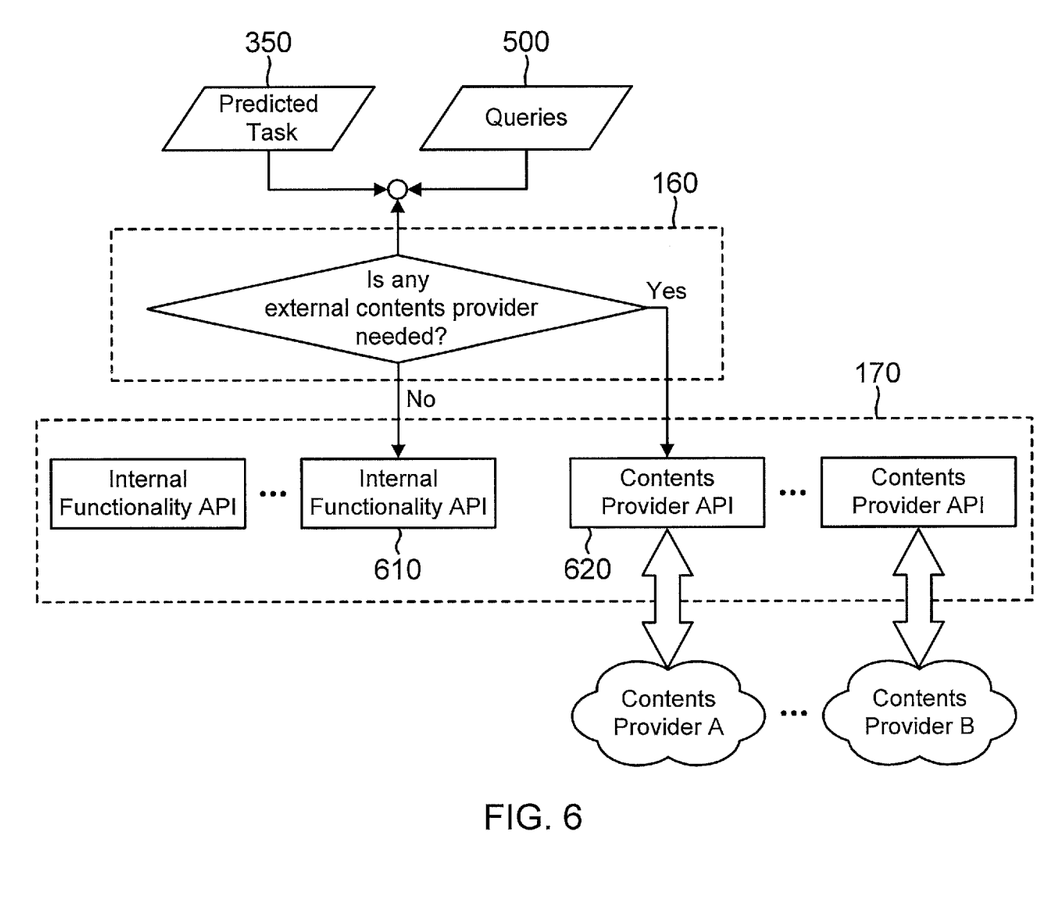
FIG. 6 is a more detailed block diagram for the task execution modules in the system of FIG. 1.

As shown in FIG. 6, task execution interface module 160 uses predicted task 350 to determine whether any external contents provider is necessary. Certain tasks do not require external contents providers such as a call task. On the other hand, a restaurant search may be performed using an external search provider. Task execution module 160 thus routes any associated queries to the appropriate API in task execution module 170. Queries needing external search providers are routed to the corresponding content provider's API 620. Conversely, queries requiring internal functions of the user's device are routed to the corresponding internal functionality API 610.

Figure 7:
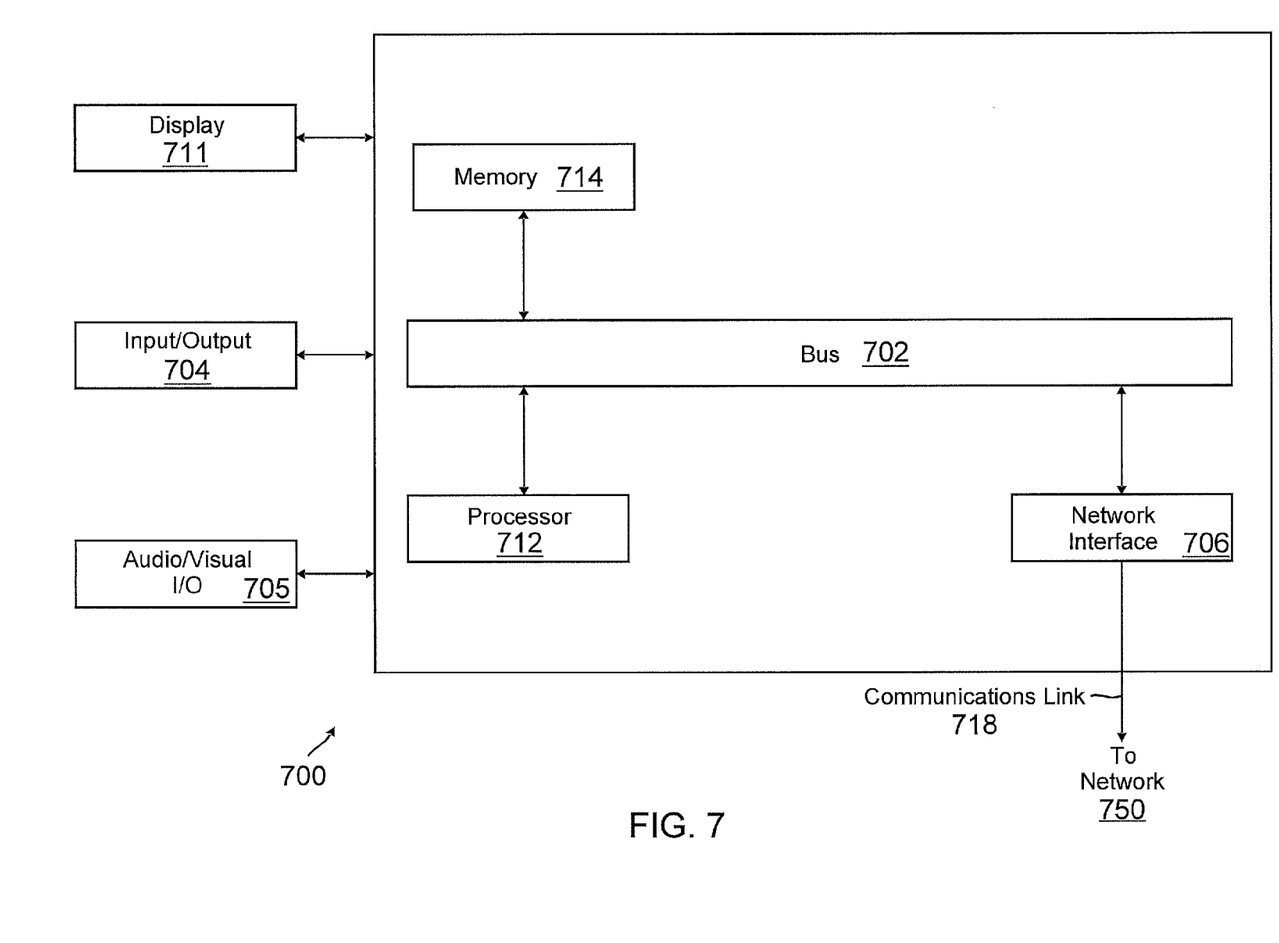
FIG. 7 illustrates a computer system configured to execute user requests in accordance with an embodiment of the disclosure.

System 100 may be implemented using one or more computers or instead may be instantiated using a configured FPGA or ASIC(s). A suitable computer system 700 for implementing one or more modules for system 100 is shown in FIG. 7. An administrator may configure system 700 using a display 711, a keyboard 704, and audio/visual I/O 705. System 700 includes at least one processor coupled to a memory 714 of instructions through a bus 702. Bus 702 also couples to a network 750 such as the internet through a network interface 706 and a communications link 718. In this fashion, a user's interactions such as natural language input 110 of FIG. 1 may be readily received by system 700 from network 750. Instructions stored in memory 714 that are executed by processor 712 to implement the various modules discussed herein may be written in Java or other suitable programming languages.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A machine-implemented method, comprising:
   requesting a plurality of users to generate human-generated user requests for each of a plurality of task categories to collect a plurality of the human-generated user requests to create a training database of user requests, each user request corresponding uniquely to one of the task categories;
   for each task category, extracting a training feature vector from each corresponding user request in the training database by assigning a numeric value to each different word in the corresponding user request to form a training data set having a plurality of training feature vectors for each task category;
   for each task category, processing the training feature vectors in the training data set corresponding to the task category to determine a task classifier model for the task category;
   receiving an additional request from a user, the additional request being classifiable into one of the task categories; and
   in the machine, comparing an extracted feature vector from the additional request to the task classifier model to identify which task category corresponds to the additional request.

2. The machine-implemented method of claim 1, further comprising:
   in the machine, comparing words in the additional request to a dictionary of possible val-ues for at least one query class for the identified task category to identify matching words or phrases in the additional request for the at least one task parameter.

3. The machine-implemented method of claim 2, further comprising:
   servicing the additional request by using the matching words or phrases.

4. The machine-implemented method of claim 1, further comprising:
   determining whether the identified task category requires an external contents provider for its completion or whether the identified task category can be performed by a portable device of the user;

invoking an application program interface for the external contents provider responsive to a determination that the identified task category requires the external contents provider for its completion; and invoking an application program interface for a program on the portable device responsive to a determination that the identified task category can be performed by the portable device.

5. The machine-implemented method of claim 4, wherein the portable device comprises a cellular telephone.

6. The machine-implemented method of claim 1, wherein the additional request comprises a natural language request, the method further comprising:

converting the natural language request into a text input; and extracting the feature vector from the text input.

7. The machine-implemented method of claim 1, wherein processing the training data set to determine a task classifier model comprises applying a machine learning algorithm to the training data set.

8. The machine-implemented method of claim 7, wherein the machine learning algorithm comprise a support vector machine training algorithm.

9. The machine-implemented method of claim 7, wherein the machine learning algorithm comprises a naïve Bayes algorithm.

10. The machine-implemented method of claim 1, wherein the task categories include a restaurant search task category, a call task category, an email task category, and a transportation task category.

\* \* \* \* \*